United States Patent [19]

Lemmon

[11] 3,833,080
[45] Sept. 3, 1974

[54] TRACTOR FRONT END CONSTRUCTION
[75] Inventor: Norman Frederick Lemmon, Cedar Falls, Iowa
[73] Assignee: Deere & Company, Moline, Ill.
[22] Filed: Apr. 5, 1973
[21] Appl. No.: 348,182

[52] U.S. Cl. ............................ 180/79.2 R, 280/87 R
[51] Int. Cl. ............................................... B62d 5/10
[58] Field of Search............ 180/79.2 R, 79.4, 79.5; 280/92, 87 R, 80 A; 308/189 R

[56] References Cited
UNITED STATES PATENTS

| | | | |
|---|---|---|---|
| 1,803,459 | 5/1931 | Boland | 308/189 R |
| 2,039,749 | 5/1936 | Strehlow | 280/92 X |
| 2,830,461 | 4/1958 | Sheppard | 180/79.2 R X |
| 2,890,892 | 6/1959 | Strehlow | 280/80 A |
| 2,909,076 | 10/1959 | Sheppard | 180/79.2 R X |
| 3,700,256 | 10/1972 | Jones | 280/87 R |

*Primary Examiner*—David Schonberg
*Assistant Examiner*—John A. Pekar

[57] ABSTRACT

A front end construction for an agricultural tractor or like vehicle comprising a unitary support mounted between the forward ends of the tractor frame and provided internally with chambers housing the hydraulic steering motor for the vehicle front wheels and provided externally with mounting portions for carrying additional tractor-related components.

5 Claims, 5 Drawing Figures

TRACTOR FRONT END CONSTRUCTION

BACKGROUND OF THE INVENTION

In conventional farm and like tractors of the type having fore-and-aft side frame members extending between the tractor front end and the rear transmission case, it has been commonplace to provide several castings and/or forgings bolted together and the frame members, one of the several components housing the hydraulic steering motor, another being bolted or screwed to the frame members, still another providing means for supporting the front axle structure on a fore-and-aft pivot and still another providing one or more attachment points for mounting front-end weights, implements, etc. Typical structures of this general type are disclosed in U. S. Pat. No. 2,871,967 to DuShane issued Feb. 3, 1959 (corresponding Canadian Pat. No. 602,697) and U. S. Pat. No. 2,962,107 to Mihal issued Nov. 29, 1960. Experience has shown that multiple-part structures of this type are costly to manufacture, difficult to service and subject to early failure in use, mainly because the connections between the parts become loose and the parts become misaligned, and, in servicing, all the parts must be disassembled to enable access to some of the internal components.

SUMMARY OF THE INVENTION

The present invention provides distinct improvements of constructions of the above type by casting the formerly separate parts as one piece and utilizing external portions of this unitary structure for mounting of the structure between the side frame members for removal as a unit along with the remainder of the structure which further carries beneath it the transverse axle structure and which has at a forward portion thereof means for mounting tractor-related auxiliaries. Of further significance is the provision within the structure of means carrying and forming part of the hydraulic steering system for the tractor steerable front wheels.

The means connecting the basic casting to the frame is such that, for servicing, the adjacent portion of the tractor, just behind the casting, can be temporarily supported, the connecting means removed and the front-wheel-supported structure moved bodily forwardly relative to the tractor. A feature in this respect is that, after the structure is moved ahead a predetermined amount, some of the connecting means may be replaced or substituted in other locations for temporarily reconnecting the structure in a forwardly displaced position.

Additionally, the steering system includes a depending shaft having a pinion driven by a rack on the steering piston means and this shaft is retained from below by a removable quill or sleeve structure that is "keyed" or "doweled" to the bottom of the basic casting by using the outer race of the bearing as a key or dowel, which is accomplished by providing the bottom of the casting with an inverted cup-shaped recess to receive a portion of the bearing race and providing the upper end of the quill or sleeve with a matching recess facing the casting recess and receiving the remainder of the bearing race.

DESCRIPTION OF THE PREFERRED EMBODIMENT

Figure 1:
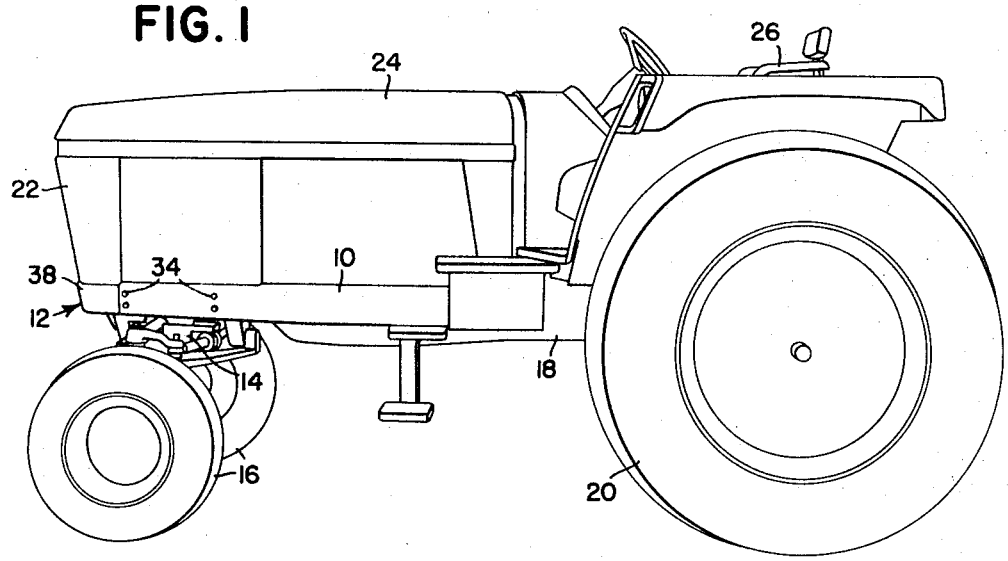
FIG. 1 is a perspective of a representative vehicle in which the present invention finds utility.

The tractor shown in FIG. 1 has a main body made up primarily of a pair of fore-and-aft side frame members 10 (see also FIG. 4), a front end structure 12 below which is a steerable front axle structure 14 having wheels 16 and a rear transmission case 18 supported on rear traction wheels 20 (only one of which appears). The tractor additionally includes a front enclosure 22, a hood 24 and an operator's station 26.

Figure 4:
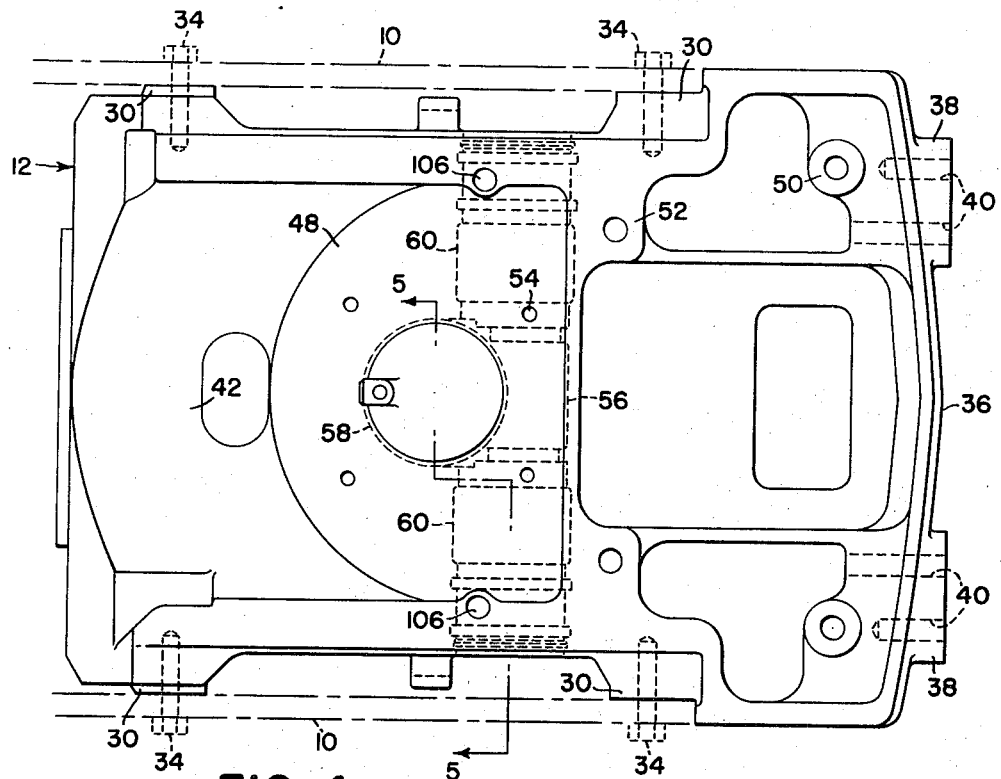
FIG. 4 is a plan view of the structure shown in FIG. 2.

The front end structure is an integrated or unitary one-piece casting having opposite side portions in the form of mounting pads 30, each being drilled and tapped at 32 for receiving cap screws 34 for rigid but removable connection to the respective side frame members 10 (FIG. 4). The casting 12 further has a forward part 36 formed with a pair of mounting pads 38 that are appropriately apertured at 40 to receive suitable fasteners (not shown) for the mounting of tractor-related accessories; e.g., bumper weights, implements, etc. (also not shown).

The casting 12 has a bottom 42 from which depends a pair of integral ears or lugs 44 drilled coaxially at 46 for reception of a pivot pin (not shown) which mounts the front axle structure 14 for limited oscillation as the tractor operates over uneven terrain. The top of the casting has mounting portions 48, 50, 52 and 54 for mounting upper components of the tractor, such as the front enclosure 22 and other parts. The one-piece casting combines the structure and functions of several individual parts used in former constructions; e.g., as in the patent referred to above. Being a casting and appropriately webbed and ribbed, it possesses more than adequate strength, particularly since it ties the basic structural components of the tractor together and eliminates "weaving" between the frame members 10 as in the past.

Of further significance is the internal compartmentation of the casting 12 so that it carries the hydraulic steering motor for the steerable front wheels 16. The basic compartmentation is best seen in dotted lines at 56 in FIG. 4. In detail the compartmentation includes a central pocket or cavity 58 formed on a vertical axis and intersected by a transverse cylindrical cavity or bore divided by the central pocket into a pair of coaxial chambers or bores 60. Each bore carries a liner 62 and these liners provide the cylinders of a hydraulic motor that includes a double-ended piston means having coaxial pistons 64 connected by an integral intermediate part in the form of a toothed rack 66.

A pinion 68 is disposed in the intermediate pocket 58 and meshes with the piston rack 66 so that reciprocation of the piston means turns the pinion and its coaxial depending pinion or steering shaft 70. This shaft is connected in usual fashion (not shown) with the tie rod means of the steerable front wheels 14. A portion of the top of the casting 12 is enlarged at 72 to receive a bushing 74 for journaling an upper coaxial shaft portion 76 of the pinion 68. The portion of the steering shaft 70 below the pinion is journaled in an antifriction bearing 78, preferably of the ball type.

For the purpose of mounting the bearing 78, the bottom 42 of the casting 12 is provided with an inverted cup-shaped recess 80 concentric with the pinion shaft and bearing. This recess is only deep enough to receive a substantial part but not all of the height of the outer race of the bearing. The remainder of the height of this outer race is received in an upwardly facing cup-shaped recess 82 in a lower quill or sleeve 84 through which the steering shaft 70 depends. Because the bearing 78 has a tight fit in both recesses 80 and 82, it serves as a "key" or "dowel" between the casting and part 84 and additional dowels, etc. are not required. The part 84 is removably secured to the casting bottom 42 as by a plurality of cap screws 86.

When it is necessary to service or remove the piston means 64–66–64, the casting 12, supported by the wheeled axle 14, may be rolled forwardly relative to the frame members 10 after the tractor has been temporarily supported at a point just rearwardly of the casting and after the connecting means or cap screws 34 are removed. Such relative forward movement spaces the axis of the steering motor ahead of the front terminal ends of the members 10 and exposes opposite end caps or retainers 88 and their cap screws 90 which are threaded into stop plugs 92. When the cap screws 86 are removed, the quill 84 may be moved downwardly, the steering shaft 70 being disconnected from the tie rod, and the pinion withdrawn downwardly. Removal of the end structures 88–90–92 enables axial removal of the double-ended piston. As an adjunct to the above, the casting 12 may be rolled forwardly just enough so that the holes in the frame members 10 for the forward cap screws 34 line up with the rear tapped bores 32, and two pairs of cap screws 34 (one pair at each side) may be replaced, thus keeping the casting 12 still tied to the tractor so that it does tip over about the front wheel axis.

Figure 2:
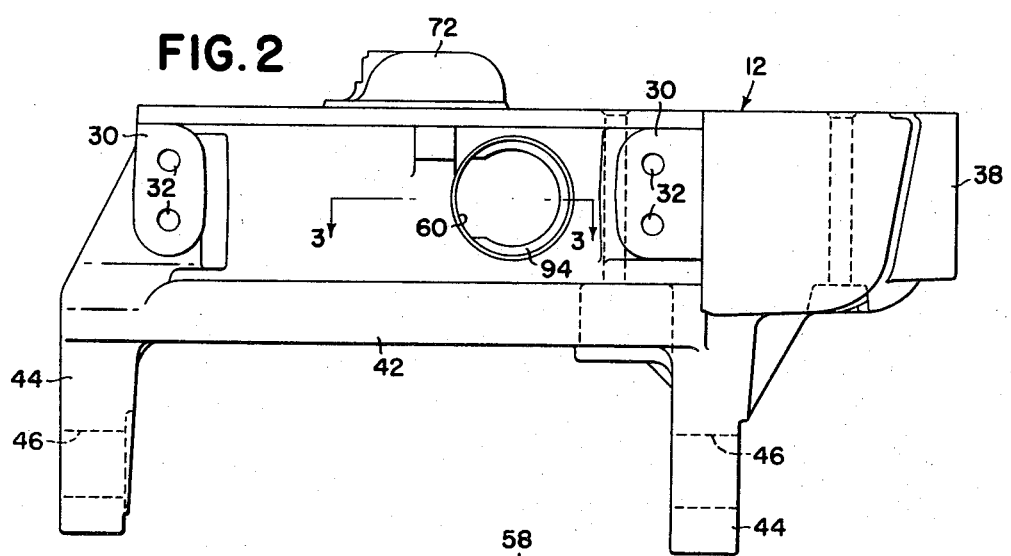
FIG. 2 is an enlarged side view of the basic casting per se, shown with its front end to the reader's right.
Figure 3:
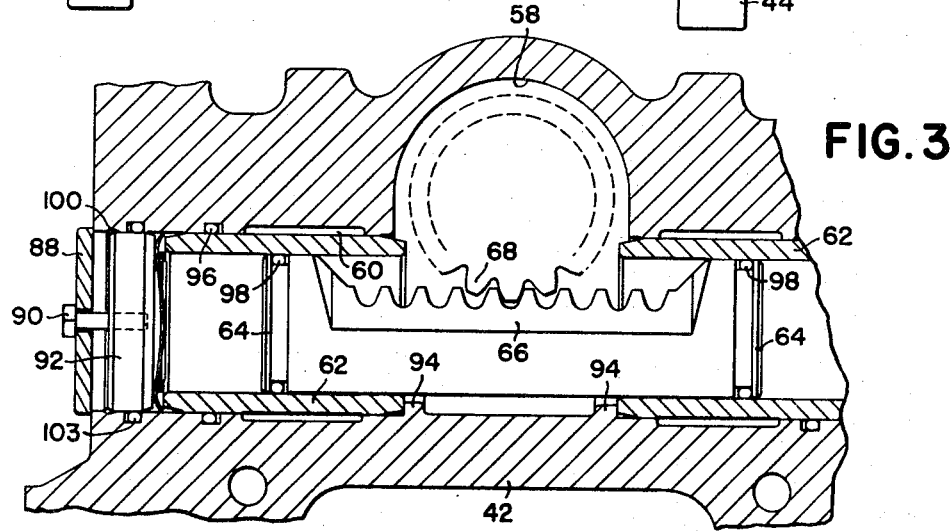
FIG. 3 is an enlarged fragmentary section as seen on the line 3—3 of FIG. 2.

Each casting cylindrical chamber or bore 60 has an internal shoulder 94 (FIGS. 2 and 3) against which the liners respectively abut. Each liner is sealed to its bore 60 by an O-ring 96, and each piston carries an O-ring 98 cooperative with its liner. Each stop plug 92 is retained by a snap ring 100 so that it is held against outward displacement. Lest the plug creep inwardly during operation, it is additionally retained by the retainer 88 and cap screw 90. The retainer has some elasticity so that it can "spring" in at its center portion when its cap screw is tightened. This keeps the plug snug against its snap ring. Each plug has an axially inward projection 102 that forms a stop for the proximate end of the piston 64 when the piston means bottoms. Without the retainer 88, the plug could creep back and forth and, when the piston bottomed, it would exert a blow on the snap ring. An O-ring 103 seals the plug to the housing 12.

Figure 5:
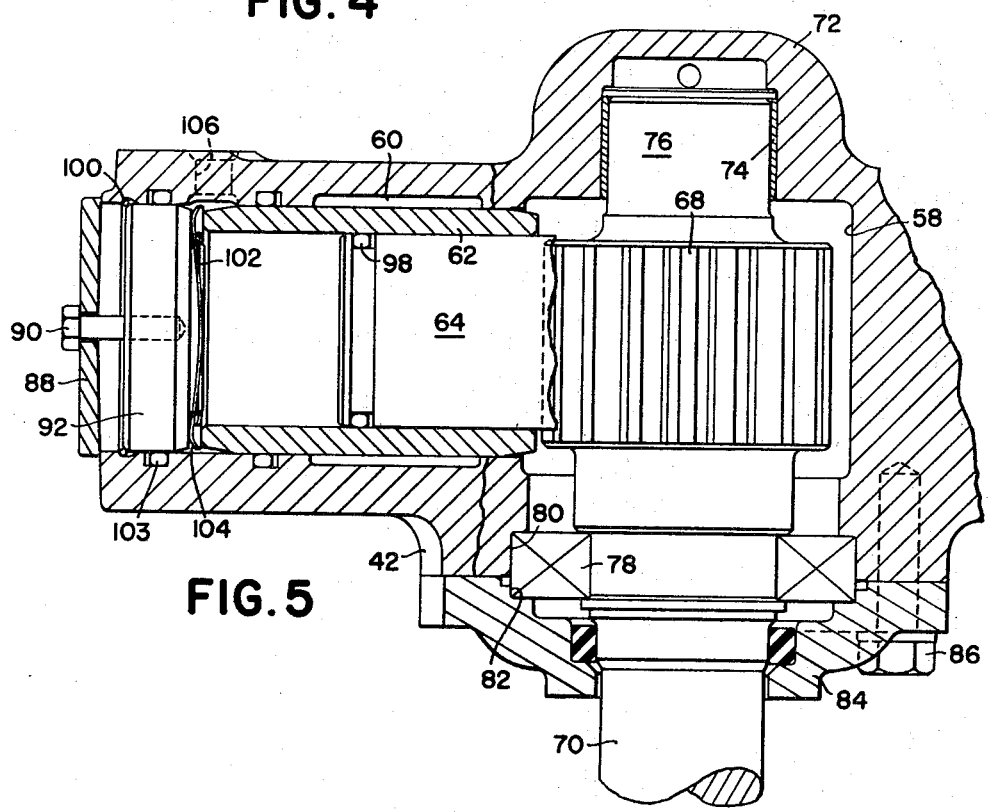
FIG. 5 is an enlarged fragmentary section on the line 5—5 of FIG. 4.

Interposed between each plug 92 and the outer end of the associated liner is elastic means, here in the form of a ring-shaped "wave" washer 104; i.e., annularly sinuous. Such washers are well known in the art. In this case the washer serves the double function of a spring and as means for enabling fluid flow through a fluid passage 106. Assuming now that fluid under pressure is introduced through the passage 106 in FIG. 5 to move the double-ended piston to the right, pressure acting on the left piston 64 also acts on the left end of the liner 62, urging the liner against its shoulder 94. The "wave" washer permits unrestricted (or substantially so) fluid flow. When the piston means is reversed and fluid flows out through the left-hand passage (FIG. 5), there is a tendency of the liner to follow the flow, but this is resited by the wave washer spring. As seen, the plug projection 102 is inwardly beyond the spring 104 so that the piston does not strike the spring.

For removal of the liner or piston means, the cap screw 90 is first unscrewed to permit removal of the retainer 88. The plug may then be forced inwardly an amount sufficient to enable the snap ring 100 to be pried out. An appropriate tool may be threaded into the now empty tapped bore left in the plug by the removal of the cap screw 90 and thus the plug may be pulled out, followed by the spring 104, etc.

Features not specifically enumerated will occur to those versed in the art, as will variations in the specific design illustrated and described.

I claim:

1. In a tractor having a main fore-and-aft frame including transversely spaced-apart frame members and a transverse axle structure beneath forward portions of the frame members and including steerable wheels, the improvement residing in a unitary, one-piece support positioned between forward portions of the frame members, front and rear removable means detachably and rigidly connecting each of the frame members to the support, a bottom portion of the support including a pair of fore-and-aft spaced-apart depending ear members for pivotal connection to a midportion of the axle structure whereby the axle structure carries the frame via the support, said support including a transverse cylindrical bore for receiving the piston of a hydraulically powered steering motor, said support including a chamber intersecting the bore and having a downwardly directed opening for journaling the steering shaft portion of the hydraulically powered steering motor, whereby, upon removal of the front and rear removable means while the frame is temporarily supported by means other than the axle structure, the support can be rolled forwardly on the axle structure wheels to a position where the hydraulically powered steering motor can be serviced.

2. The invention defined in claim 1 in which the opposite sides of the support are provided with mounting pads for connection to the respective frame members and the forward portion includes at least one vertically surfaced mounting pad for the tractor attachments.

3. The invention defined in claim 2 in which the support includes a top having a further mounting surface for carrying an additional tractor part.

4. The invention defined in claim 1 in which each of the front and rear removable means comprises a tapped bore in the respective side of the support and a cooperating screw member passing through the associated frame member into the respective bore, the bores and screw members are substantially alike, and the wheel-carried support is movable forwardly until the forward screw members can be replaced into the rear bores, respectively, to form additional support for the tractor during servicing of the hydraulically powered steering motor.

5. The invention defined in claim 1 wherein the bottom support is provided with an inverted cup-shaped recess surrounded by a lower horizontal mounting face concentric with the downwardly directed opening, a member including an upwardly open cup-shaped recess matching and complementary the first-mentioned recess and surrounded by an upper horizontal mounting face matching the first-mentioned mounting face is held in abutting relationship with the support by removable fastener means, an annular antifriction bearing is carried tightly in the complementing recesses, partly in one recess and partly in the other so as to prevent relative horizontal shifting of the support and member, and the steering shaft portion of the hydraulically powered steering motor is journaled in the bearing and extends at least partially into the member, through the chamber and into an upper bore provided in the support coaxially with the recesses.

* * * * *